(12) United States Patent
Childers et al.

(10) Patent No.: US 12,164,155 B2
(45) Date of Patent: Dec. 10, 2024

(54) LENSED FERRULE WITH LOW BACK REFLECTION

(71) Applicant: US Conec, Ltd, Hickory, NC (US)

(72) Inventors: Darrell R. Childers, Hickory, NC (US); Daniel D. Kurtz, Huntersville, NC (US); Ke Wang, Waxhaw, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/391,532

(22) Filed: Aug. 2, 2021

(65) Prior Publication Data

US 2021/0364708 A1    Nov. 25, 2021

Related U.S. Application Data

(63) Continuation of application No. 16/812,342, filed on Mar. 8, 2020, now Pat. No. 11,086,084, which is a continuation of application No. 15/900,523, filed on Feb. 20, 2018, now Pat. No. 10,585,248.

(60) Provisional application No. 62/461,073, filed on Feb. 20, 2017.

(51) Int. Cl.
*G02B 6/38* (2006.01)
(52) U.S. Cl.
CPC ......... *G02B 6/3853* (2013.01); *G02B 6/3839* (2013.01); *G02B 6/3861* (2013.01)
(58) Field of Classification Search
CPC ... G02B 6/3861; G02B 6/3839; G02B 6/3853
See application file for complete search history.

(56) References Cited

U.S. PATENT DOCUMENTS

| 5,903,536 | A | 5/1999 | Lee et al. | |
|---|---|---|---|---|
| 8,985,865 | B2 | 3/2015 | Howard et al. | |
| 10,746,942 | B2 | 8/2020 | Haase et al. | |
| 2011/0123150 | A1* | 5/2011 | Zbinden | G02B 6/4249 385/33 |
| 2012/0093462 | A1 | 4/2012 | Childers et al. | |
| 2013/0308910 | A1* | 11/2013 | Nishimura | G02B 6/381 385/78 |
| 2014/0264030 | A1 | 9/2014 | Lin et al. | |
| 2015/0226922 | A1* | 8/2015 | Childers | G02B 6/3885 385/80 |
| 2015/0268425 | A1* | 9/2015 | de Jong | G02B 6/4214 385/33 |

FOREIGN PATENT DOCUMENTS

EP     3525020 A1    8/2019

\* cited by examiner

*Primary Examiner* — Sung H Pak
*Assistant Examiner* — Hoang Q Tran
(74) *Attorney, Agent, or Firm* — Michael L Leetzow PLLC; Shubhrangshu Sengupta

(57) ABSTRACT

A fiber optic ferrule has an entrance surface that is angled at an angle that other than perpendicular to the optical fiber axis. The optical fibers disposed within the fiber optic ferrule are preferably separated from the entrance surface. These features reduce the amount of reflection of the light back into the optical fiber and increase the performance of the fiber optic ferrule.

18 Claims, 15 Drawing Sheets

$$r_1 = \left(\frac{n_1 - n_0}{n_1 + n_0}\right)^2$$

$$r_2 = \left(\frac{n_2 - n_1}{n_2 + n_1}\right)^2$$

$$x = d\tan(2\theta)$$

$$z = 2d$$

$$\omega_2 = \omega_0 \sqrt{1 + \left(\frac{\lambda z}{n_1 \pi \omega_0^2}\right)^2}$$

$$\omega_1 = \omega_0$$

$$T = \left(\frac{2\omega_1\omega_2}{\omega_1^2 + \omega_2^2}\right)^2 \exp\left[-\frac{2(m_1\omega_1\omega_2 2\theta)^2}{(\omega_1^2+\omega_2^2)\lambda^2}\right]\exp\left[-\frac{2x^2}{\omega_1^2+\omega_2^2}\right]$$

$$RL = -10\log\left[(1-r_1)^2 r_2 T + r_1\right]$$

*Fig. 4*

LENSED FERRULE WITH LOW BACK REFLECTION

REFERENCE TO RELATED CASE

This application claims priority under 35 U.S.C. § 119 (e) to provisional application No. 62/461,073 filed on Feb. 20, 2017, and under 35 U.S.C. § 120 to U.S. Pat. No. 10,585,248, issued on Mar. 10, 2020, and to U.S. Pat. No. 11,086,084, issued on Aug. 10, 2021, the contents of which are hereby incorporated by reference in their entirety.

BACKGROUND OF THE INVENTION

Existing lens ferrule designs that use single-mode optical fibers create significant return loss, also known as back-reflection. Within a current lensed ferrule, light exits the fiber and if there is a gap between the fiber and ferrule, the light travels through an optically transparent adhesive, followed by several hundreds of microns of the optical polymer used to make the ferrules, and then exits the polymer ferrule material, typically through a lens. The refractive index of the polymer ferrule material differs significantly from the fiber, which causes the primary reflection of light as the light transmits through the index of refraction change of the ferrule from the optically transparent adhesive. The light reflecting back into the optical fiber contributes to a return loss.

In order to reduce the reflection of the light back in to the optical fiber and the ferrule itself, Applicant has determined that if the surface of the ferrule where the light enters after leaving the optical fiber and adhesive is disposed at an angle, the reflection can be reduced to an acceptable amount. The reflection may also be reduced if the front end of the optical fiber is disposed some distance from the entrance surface.

SUMMARY OF THE INVENTION

The present invention is directed to a fiber optic ferrule that includes a main body having a front end, a back end, and a middle portion disposed between the front end and back end, a first opening through the back end of the main body, the first opening configured to receive at least two optical fibers through the back end of the main body, a plurality of optical fiber openings disposed in the middle portion and in communication with and extending from the first opening toward the front end, each of the plurality of optical fiber openings configured to receive an optical fiber inserted through the back end and having a longitudinal axis, a second opening disposed between the middle portion and the front end, the second opening extending through a surface of the main body and being in communication with the plurality of optical fiber openings, and a front portion, the front portion disposed between the second opening and the front end, the front portion having at least one entrance surface that is non-perpendicular to the longitudinal axes of the plurality of optical fiber openings, the at least one entrance surface being a rearward facing surface.

In some embodiments, the at least one entrance surface is in a front hole in the front portion and is in communication with the second opening.

In some other embodiments, the fiber optic ferrule further includes at least one optical fiber stop, the at least one optical fiber stop configured to engage a front end of an optical fiber inserted through at least one of the plurality of optical fiber openings.

In another embodiment, the at least one entrance surface comprises a flat surface having an angle of about 4 degrees.

According to another aspect of the present invention, there is a fiber optic ferrule that includes a main body having a front end, a back end, and a middle portion disposed between the front end and back end, a first opening through the back end of the main body, the first opening configured to receive a plurality of optical fibers through the back end of the main body, a plurality of optical fiber openings disposed in the middle portion and in communication with and extending from the first opening toward the front end, each of the plurality of optical fiber openings configured to receive an optical fiber inserted through the back end and having a longitudinal axis, a second opening disposed between the middle portion and the front end, the second opening extending through a surface of the main body and being in communication with the plurality of optical fiber openings, a front portion, the front portion disposed between the second opening and the front end, the front portion having at least one entrance surface that is non-perpendicular to the longitudinal axes of the plurality of optical fiber openings, the at least one entrance surface being a rearward facing surface, a plurality of optical fibers, each of the plurality of optical fibers disposed in respective one of the plurality of optical fiber openings, and index matching adhesive disposed in the second opening and at ends of the optical fibers.

According to another aspect of the present invention, there is a fiber optic ferrule that includes a main body having a front end, a back end, and a middle portion disposed between the front end and back end, a first opening through the back end of the main body, the first opening configured to receive at least two optical fibers through the back end of the main body, a plurality of optical fiber openings disposed in the middle portion and in communication with and extending from the first opening toward the front end, each of the plurality of optical fiber openings configured to receive an optical fiber inserted through the back end and having a longitudinal axis, a second opening disposed between the middle portion and the front end, the second opening extending through a surface of the main body and being in communication with the plurality of optical fiber openings, and an entrance surface forming a portion of the second opening, the entrance surface being non-perpendicular to the longitudinal axes of the plurality of optical fiber openings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 4 shows the calculations required to determine return loss;

DETAILED DESCRIPTION OF THE INVENTION

Figure 1:
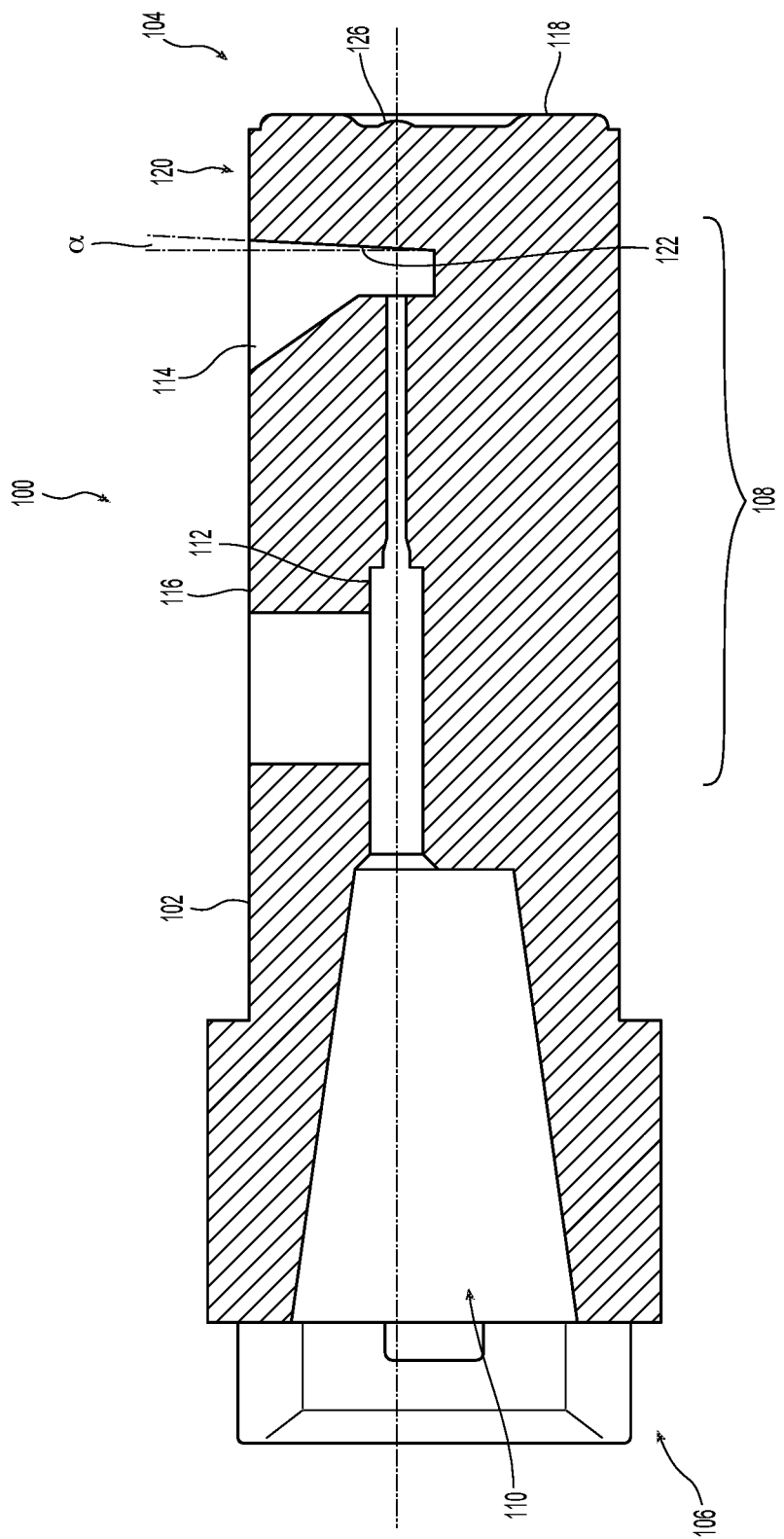
FIG. 1 is a cross section of one embodiment of an optical ferrule according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
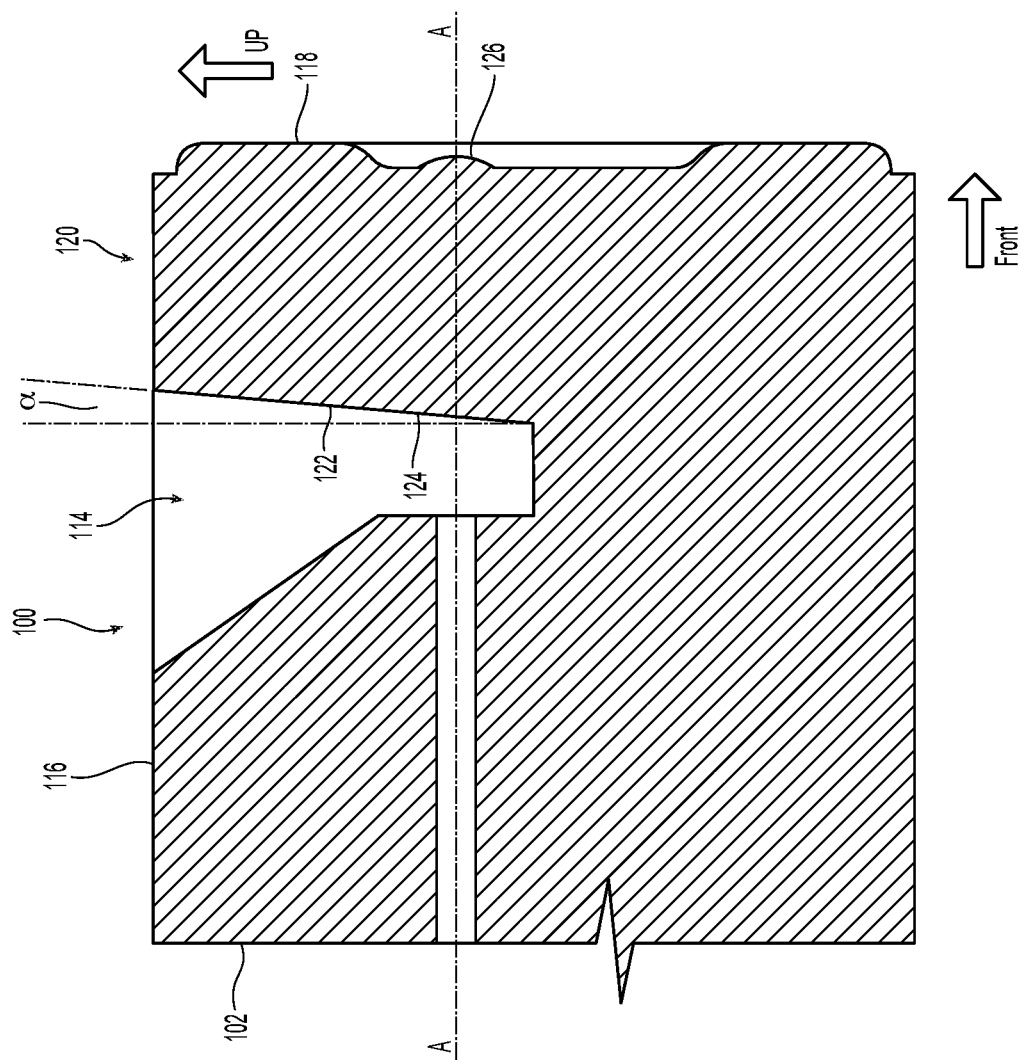
FIG. 2 is an enlarged view of the front end of the optical ferrule of FIG. 1.
Figure 3:
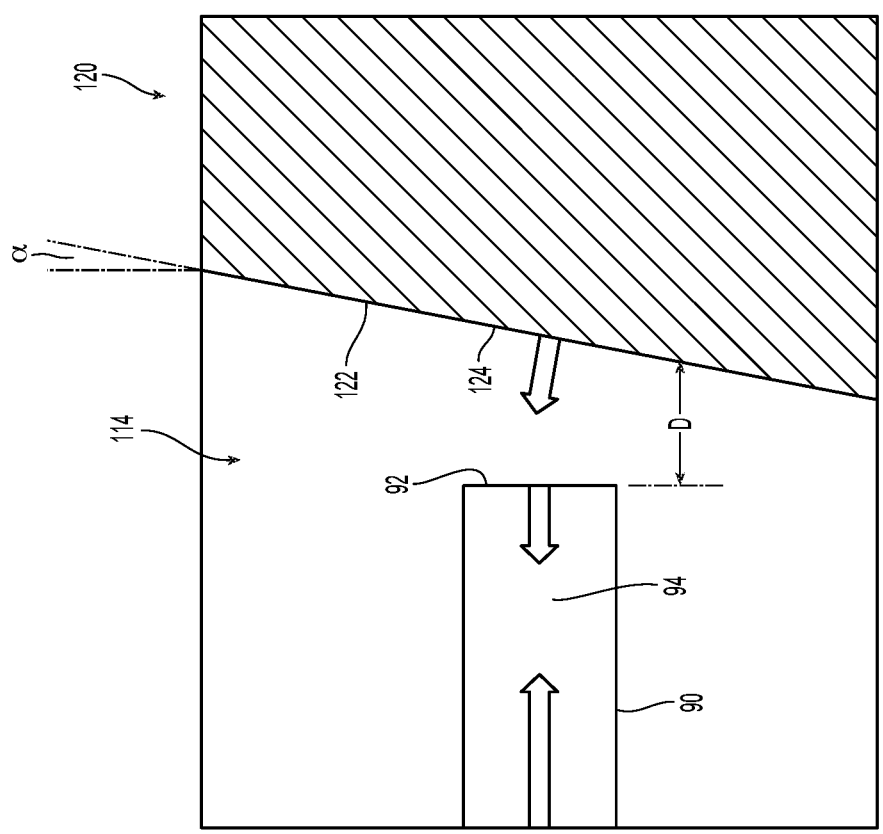
FIG. 3 is a schematic of the optical ferrule of FIG. 1 and the entrance surface in the second opening thereof.

FIGS. 1-3 illustrate one embodiment of a fiber optic ferrule 100 according to the present invention. The fiber optic ferrule 100 has a main body 102 with a front end 104 and a back end 106. Between the front end 104 and the back end 106 is a middle portion 108. The fiber optic ferrule 100 has a first opening 110 through the back end 106 of the main body 102 to receive optical fibers 90. The fiber optic ferrule 100 has a plurality of optical fiber openings 112 disposed within the middle portion 108 of the main body 102. The plurality of optical fiber openings 112 extend from the first opening 110 forward towards the front end 104. The plurality of optical fiber openings 112 are configured to receive the optical fibers 90 inserted through the back end 106. The plurality of optical fiber openings 112 each have a longitudinal axis A extending along the plurality of optical fiber openings 112.

The plurality of optical fiber openings 112 terminate at a second opening 114 and are thus in communication therewith. The second opening 114 is configured to receive an adhesive (preferably epoxy that has a refractive index that is the same as the core of the optical fiber) in order to secure the optical fibers within the fiber optic ferrule 100. The second opening 114 is illustrated as opening through a top surface 116 of the fiber optic ferrule 100. As would be known in the art, the second opening 114 could be through another surface of the fiber optic ferrule 100. Preferably the longitudinal axis A of each of the plurality of optical fiber openings 112 is parallel to the top surface 116 and perpendicular to the front face 118.

As used herein, the term "front" and "forward" means that direction where the fiber optic connector would mate with another fiber optic connector or device, while the term "rear" or "rearward" is used to mean the direction from which the optical fibers enter into the fiber optic ferrule. So turning to FIG. 2, the front is the direction shown by the arrow and "back" or "rearward" is the opposite direction. Thus, the front of the fiber optic ferrule 104 is pointed to the right in FIG. 2 and the rear or rearward end of the fiber optic ferrule 104 is pointing to the left. Similarly, the top of the fiber optic ferrule 100 is that side that has an opening into the fiber optic ferrule on the upper part of FIG. 2 while the bottom is on the bottom of FIG. 2. Further, it will be appreciated that the optical fibers herein may be single mode or multi-mode and, depending on the type of optical fiber, the point of contact of the optical fibers to the entrance surface of the ferrule will change.

A front portion 120 is disposed between the second opening 114 and the front end 104. The second opening 114 has a front wall 122 that defines the boundary between the second opening 114 and the front portion 120. This front wall 122 is the entrance surface 124 of the fiber optic ferrule, where the light from the optical fiber enters the front portion 120 of the fiber optic ferrule 100. Thus, the term "entrance surface" relates to a surface of the front portion 120 that forms an interface between the second opening 114 and the front end 104 where light crosses the boundary between the front portion 120 and the second opening 114. Alternatively, the principles of this boundary act in the same way when the light travels in the opposite direction-through the fiber optic ferrule and into the optical fiber. Typically, the front wall 122 is perpendicular to the top surface 116, the plurality of optical fiber openings 112 (including longitudinal axis A), and the front end 92 of the optical fibers 90. The front wall 122 is also typically parallel to the front face 118. See FIG. 1. In some fiber optic ferrules, the front wall 122 even acts as an optical fiber stop-essentially eliminating the space between the front end of the optical fiber and the front wall. See, e.g., FIG. 6. The front portion 120 may also have a lens 126 at the front end 104. The lens 126 will collimate the light to allow for optical connection of the fiber optic ferrule 100 to another ferrule, connector, or device.

In the present invention, the front wall 122 is disposed at an angle $\alpha$ relative to the front face 118 and the front end 92 of the optical fiber as can be seen in FIGS. 2 & 3. As such, the front wall 122 is also no longer perpendicular to the longitudinal axis A. The angle $\alpha$ is preferably between 1 and 5 degrees. The angle $\alpha$ is very well controlled and is not simply a tolerance error.

In the present invention, the optical fibers 90 are also separated from the front wall 122 by a predetermined distance D. FIG. 3 illustrates that the optical fiber 90 is separated from the front wall 122. It should be noted that even if the optical fiber 90 were to engage the front wall 122, the core 94 of the optical fiber would still be separated from the front wall 122 due to the angle $\alpha$. Referring back to FIG. 3 and then with reference to FIG. 4, the variables used in the calculations to determine the return loss of a fiber optic ferrule are:

$\lambda$: wavelength of the light in the optical fiber;
$\omega_0$: effective mode radius in single mode fiber at $\lambda$, where $\omega_{0=4.6}$ µm at $\lambda=1.31$ µm and $\omega_{0=5.2}$ µm at $\lambda=1.55$ µm;
z: optical path (twice the distance from fiber to ferrule);
x: lateral offset between beam in fiber and beam reflected by ferrule;
$\omega_1$: initial beam radius;
$\omega_2$: radius of reflected beam at fiber;
T: coupling efficiency at fiber between fiber mode and reflected mode;
RL: return loss.

The refractive indices ($n_r$) of the ferrule material, the fiber core and any adhesive are also variables included in the calculation of the return loss.

Figure 5:
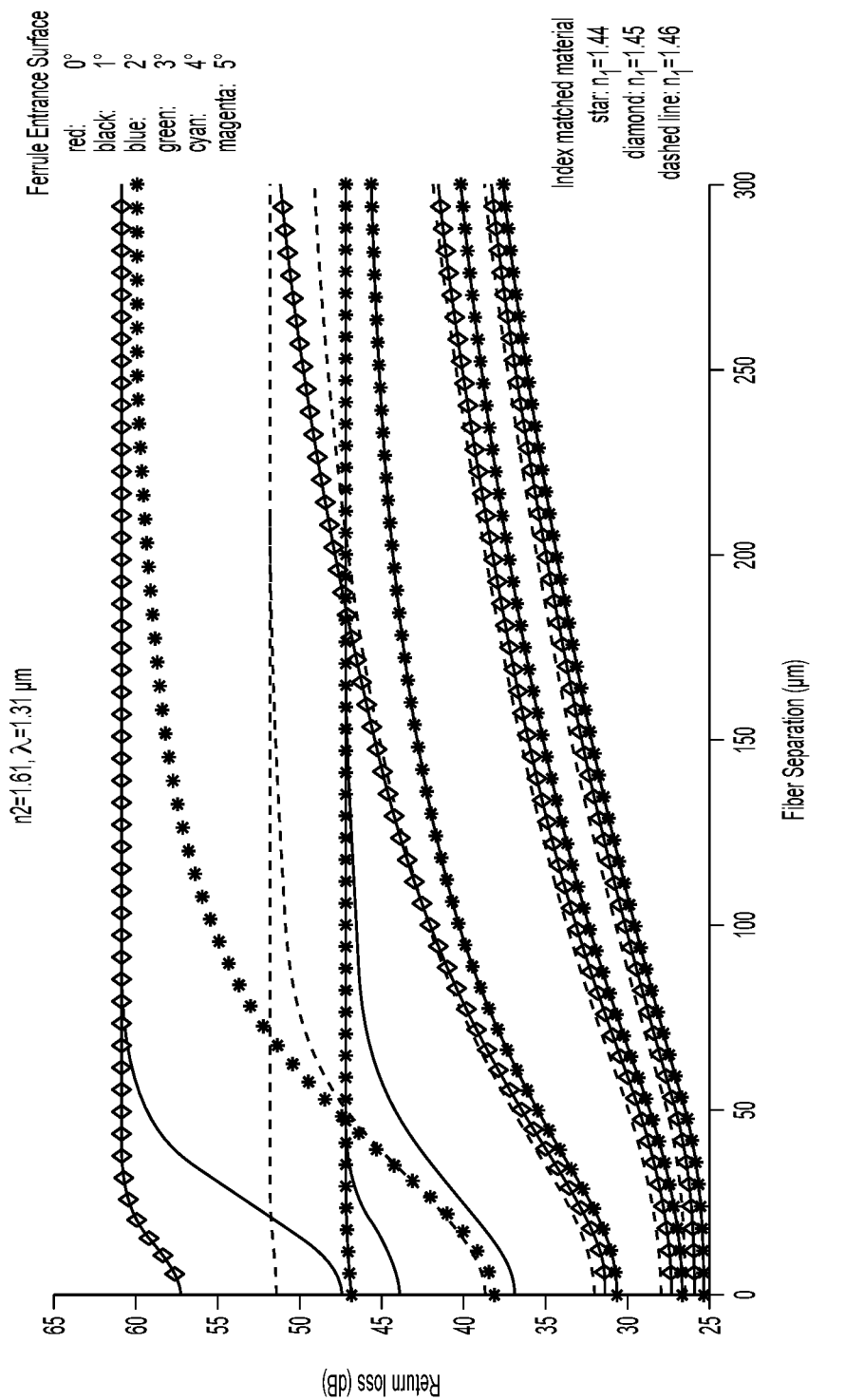
FIG. 5 is a graph showing the return loss for a plurality of angles and optical fiber separation.

Applicant has found that if the angle α is 5°, then the return loss is 45 dB or greater. Although there is not only one return loss specification for all connectors, 45 dB is a common requirement in today's optical networks. See FIG. 5 showing the effect of the angle and the optical fiber separation on the return loss.

While the angle α improves (i.e., reduces) the back reflection into the fiber, as the light transmits through the angled surface, the beam is skewed away from the angled surface and an aberration is created in the light beam in the fiber optic ferrule 100. The top and bottom marginal rays of the light beam then go through two different optical path lengths, which create a wavefront aberration. Such a wavefront aberration can be compensated by making an "irregular" lens 126 that is not rotationally symmetric about the center of the lens. Another aberration is created due to errors of the fiber tip cleave. If the cleave is not perfectly perpendicular to the fiber core axis, a different aberration is created, which is typically minimized with the index matching material.

Figure 6:
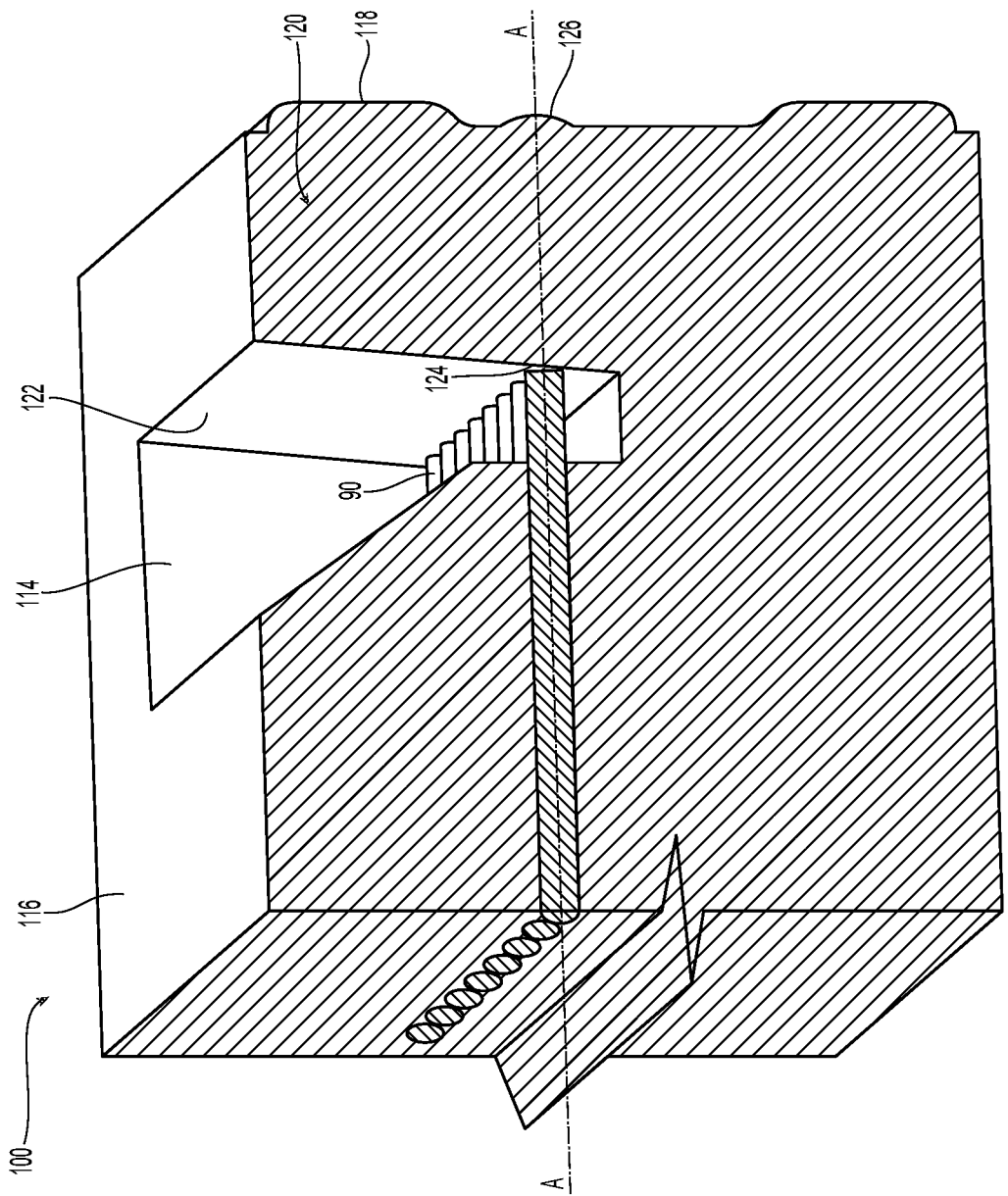
FIG. 6 is a view of a portion of the optical ferrule of FIG. 1 in cross section with the optical fiber disposed against the entrance surface.
Figure 7:
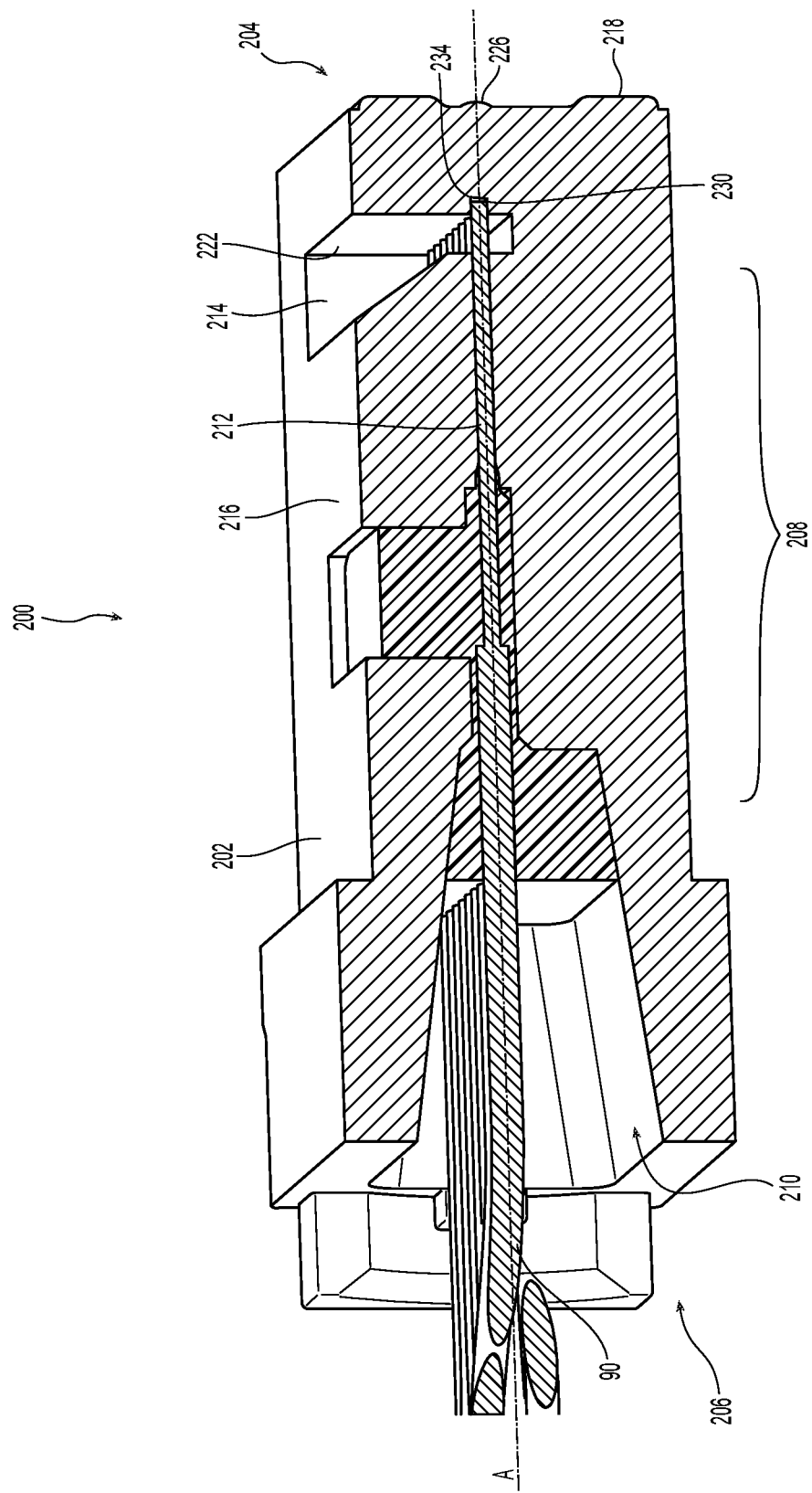
FIG. 7 is a cross section of a second embodiment of an optical ferrule according to the present invention.
Figure 8:
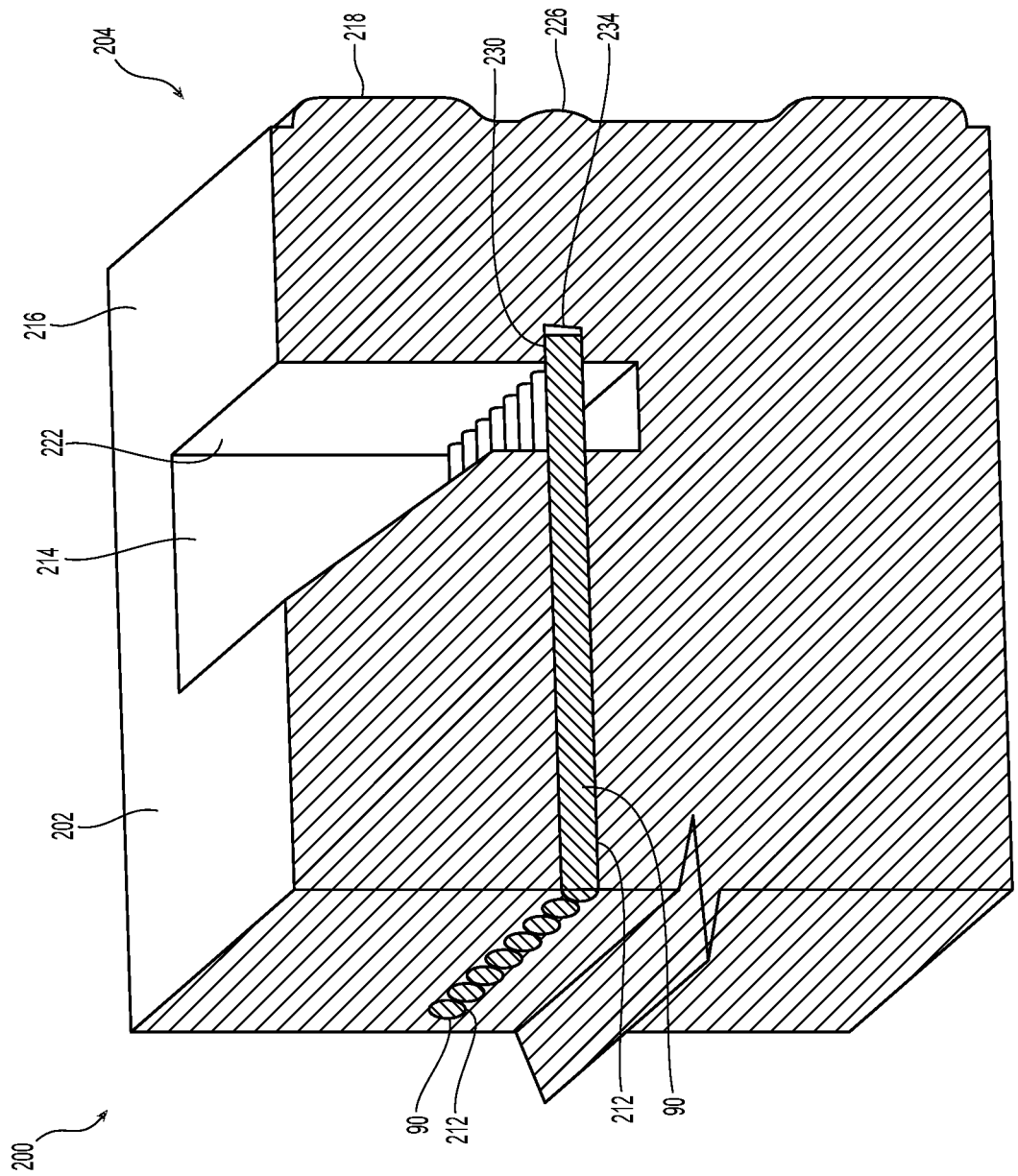
FIG. 8 is an enlarged view of the front end of the optical ferrule of FIG. 7.

FIG. 6 illustrates the optical fiber 90 engaging the front wall 122 of the fiber optic ferrule 100. In this embodiment, the core 94 of the optical fiber 90 is about 5 microns from the front wall 122 or entrance surface of the fiber optic ferrule 100 because of the angle of the entrance surface. It should be noted that the bottom of the optical fiber 90 engages the entrance surface 124 and, with the front end 92 being perpendicular, the core 94 is about 5 microns from the entrance surface 124 (for a fiber of 62.5 micron radius, 62.5× sin 5°=5) As noted in the graph in FIG. 5, the optical fiber may be disposed such that the front end 92 is farther (in a rearward direction) from the entrance surface 122 than 5 microns.

second embodiment of a fiber optic ferrule 200 is illustrated in FIGS. 7 and 8. The fiber optic ferrule 200 is similar to the fiber optic ferrule 100 except that is has a different front end. Thus, the fiber optic ferrule 200 has a main body 202 with a front end 204 and a back end 206. Between the front end 204 and the back end 206 is a middle portion 208. The fiber optic ferrule 200 has a first opening 210 through the back end 206 of the main body 202 to receive optical fibers 90. The fiber optic ferrule 200 has a plurality of optical fiber openings 212 disposed within the middle portion 208 of the main body 202. The plurality of optical fiber openings 212 extend from the first opening 210 forward towards the front end 204. The plurality of optical fiber openings 212 are configured to receive the optical fibers 90 inserted through the back end 206. The plurality of optical fiber openings 212 each have a longitudinal axis A extending along the plurality of optical fiber openings 212.

The plurality of optical fiber openings 212 terminate at a second opening 214 and are thus in communication therewith. The second opening 214 also has a front wall 222 that mostly defines the boundary between the second opening 214 and a front portion 220-except as noted below. The second opening 214 is configured to receive an adhesive (preferably epoxy that has a refractive index that is the same as of the core 94 of the optical fiber) in order to secure the optical fibers within the fiber optic ferrule 200. The second opening 214 is illustrated as opening through a top surface 216 of the fiber optic ferrule 200. As would be known in the art, the second opening 214 could be through another surface of the fiber optic ferrule 200. Preferably the longitudinal axis A of each of the plurality of optical fiber openings 212 is parallel to the top surface 216 and perpendicular to the front face 218.

The front portion 220 has a plurality of front holes 230, one for each of the optical fiber openings. See FIG. 8. The front holes 230 are in line with and are a continuation of the optical fiber openings 212 across the second opening 214. Each of the front holes 230 has an entrance surface 234 at the end of the front holes 230 that is also angled at the angle α. The end 92 of each of the optical fibers 90 are preferably disposed within the front holes 230, but are at least 5 microns from the entrance surface 234. The angle α and the distance D are again determined by the equations in FIG. 4 as discussed above, depending on the ferrule material, the refractive index of the optical fiber, and the like, the distance D is dependent on these factors, too. The front portion 220 may also have a lens 226 at the front end 204 to correct the aberrations from the angled entrance surface 234.

Figure 9:
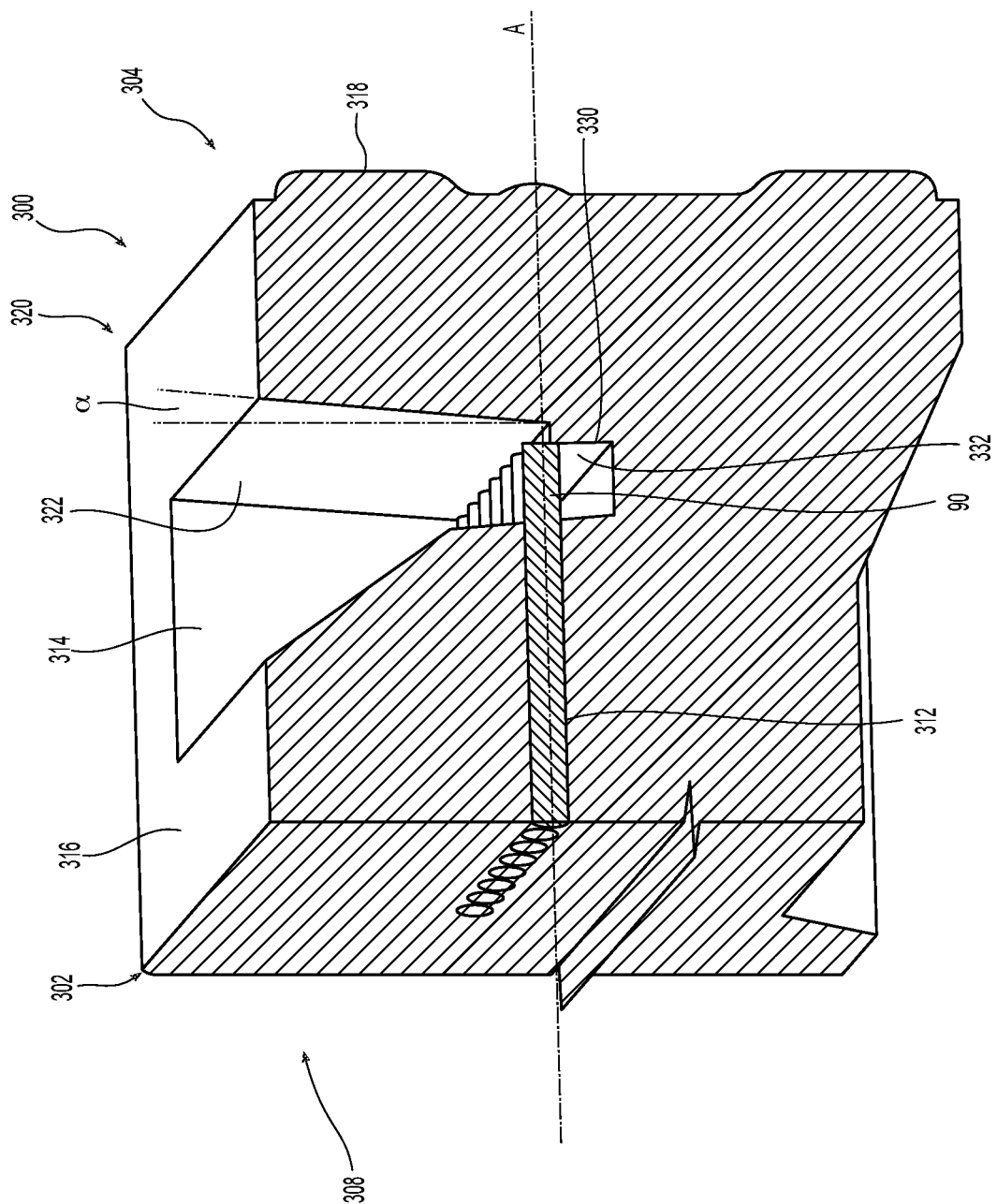
FIG. 9 is a cross section of a third embodiment of an optical ferrule according to the present invention.

A third embodiment of a fiber optic ferrule 300 is illustrated in FIG. 9 and has the same general construction as the other ferrules. The fiber optic ferrule 300 has a different front end and second opening. The fiber optic ferrule 300 has a main body 302 with a front end 304 and a middle portion 308. The fiber optic ferrule 300 has a plurality of optical fiber openings 312 disposed within the middle portion 308 of the main body 302. The plurality of optical fiber openings 312 extend towards the front end 304. The plurality of optical fiber openings 312 are configured to receive the optical fibers 90 inserted through the back end 306. The plurality of optical fiber openings 312 each have a longitudinal axis A extending along the plurality of optical fiber openings 312.

The plurality of optical fiber openings 312 terminate at a second opening 314 and are thus in communication therewith. The second opening 314 also has a front wall 322 that mostly defines the boundary between the second opening 314 and a front portion 320-except as noted below. The second opening 314 is configured to receive an adhesive (preferably epoxy that has a refractive index that is the same as of the core 94 of the optical fiber) in order to secure the optical fibers within the fiber optic ferrule 300. The second opening 314 is illustrated as opening through a top surface 316 of the fiber optic ferrule 300. As would be known in the art, the second opening 314 could be through another surface of the fiber optic ferrule 300. Preferably the longitudinal axis A of each of the plurality of optical fiber openings 312 is parallel to the top surface 316 and perpendicular to the front face 318.

The front wall 322 functions as the entrance surface in this embodiment and has the angle α. The front portion 320 (and the second opening 314) has a fiber stop 330 to set the distance D to a predetermined distance. The fiber stop 330 may be an extension of the front wall 322 (i.e., made of the same material) and formed at the same time as the rest of the fiber optic ferrule. Alternatively, the fiber stop 330 can be added after or machined out of the second opening 314. The fiber stop 330 preferably starts at the bottom of the second opening 314 and extends upward, but could only extend along a portion of the height of the front wall 322 to where it would engage the bottom of the optical fiber 90. The fiber stop 330 also has an engagement surface 332 that is parallel to the end 92 of the optical fibers 90 (and also the front face 318). As illustrated in the figures, the fiber stop 330 engage the optical fibers 90 with the engagement surface 332. Thus, the fiber stop 330 engages the bottom of an optical fiber (the cladding). The light would then pass over the fiber stop 330 on the way to the entrance surface of the fiber optic ferrule 100. It would also mean that the angled entrance surface would only have to start above the fiber stops 330. The fiber stop 330 could also be divided into a plurality of fiber stops as well.

Figure 10:
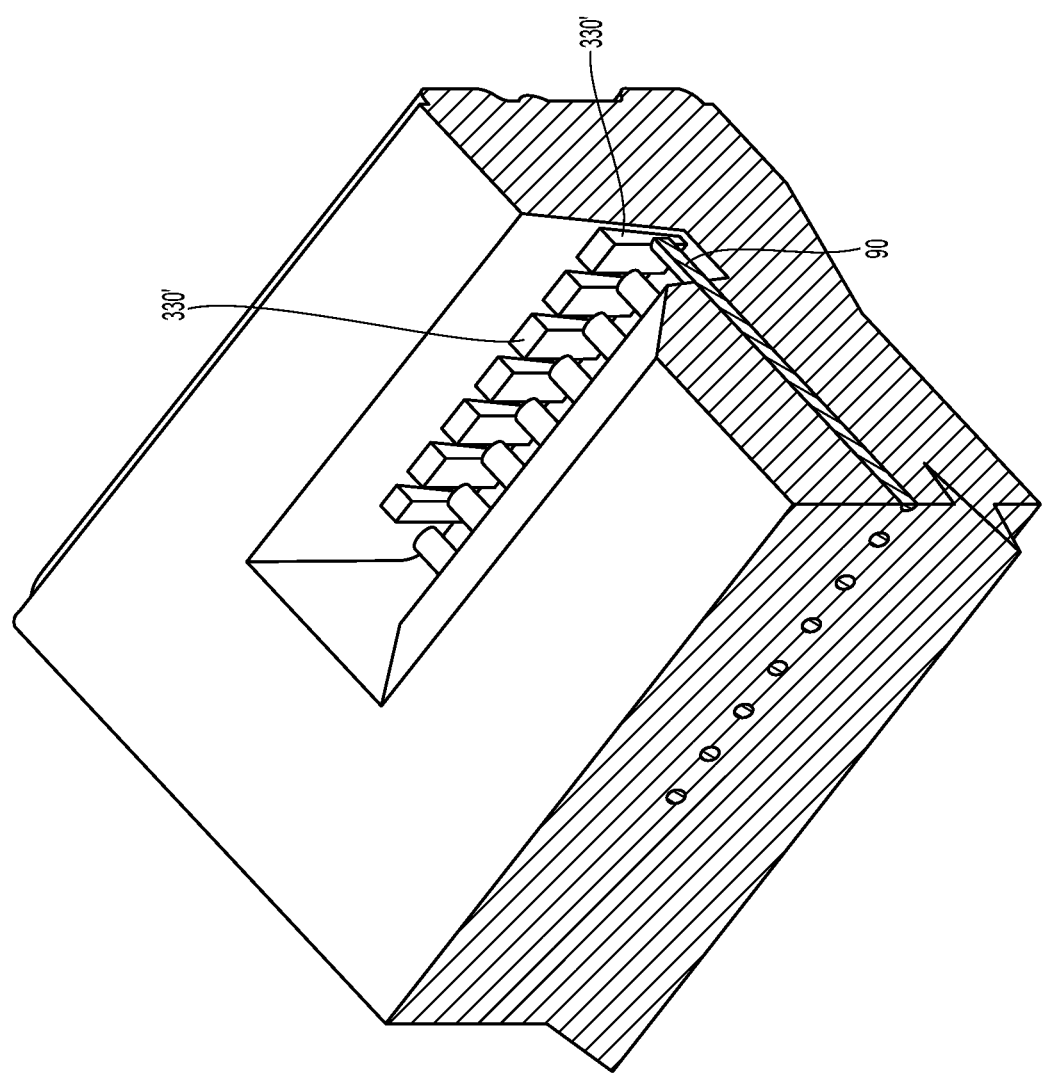
FIG. 10 is an enlarged perspective view of the front end of a fourth embodiment of an optical ferrule according to the present invention.

It is also a possibility that there could also be a plurality of fiber stops 330' adjacent one another that engage two adjacent optical fibers 90. See FIG. 10. In this configuration, each of the fiber stops 330' would engage opposing sides of adjacent optical fibers 90. In this configuration, the light from the optical fibers would pass between the fiber stops 330' and the entrance surface would have to be angled between the fiber stops.

Figure 11:
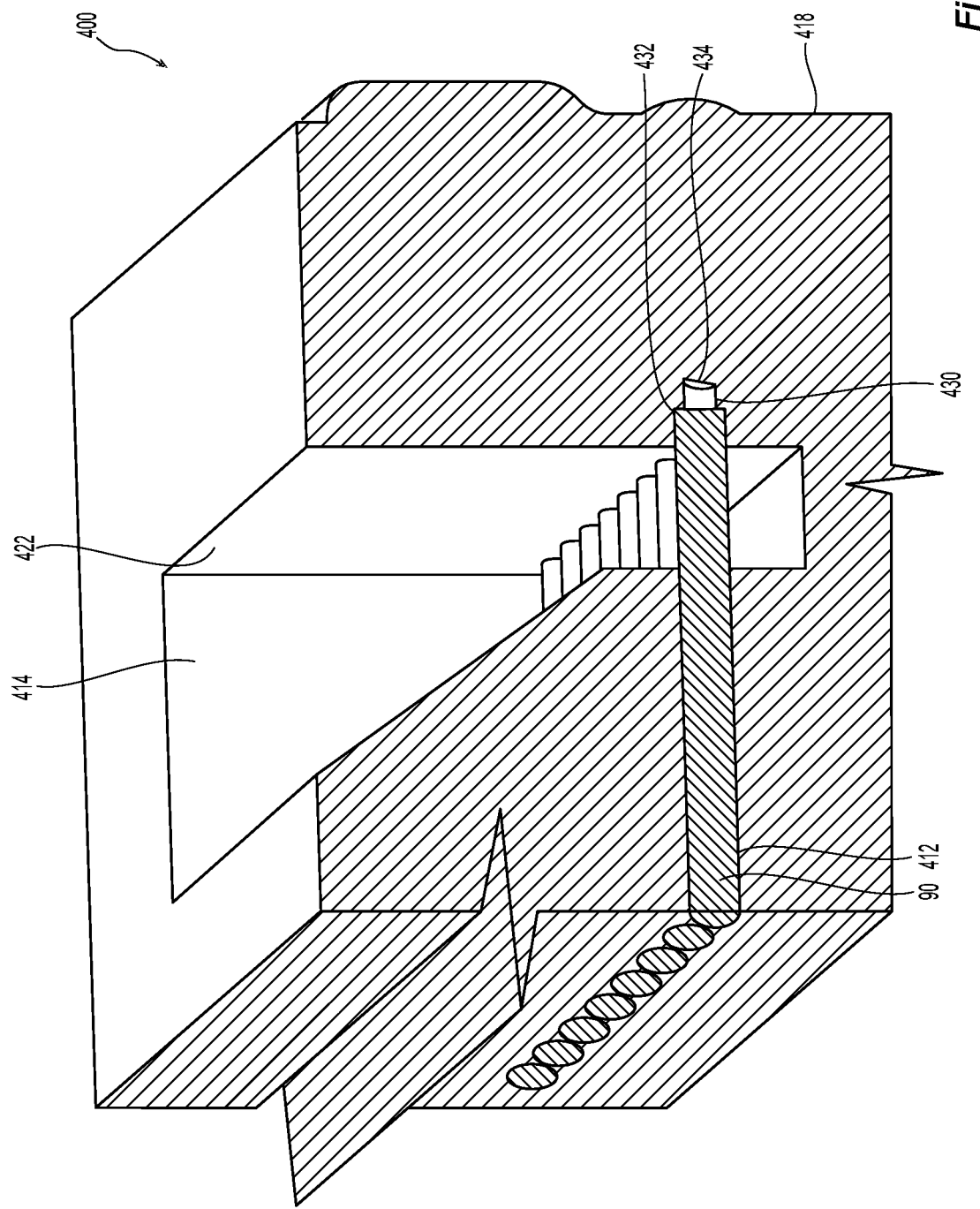
FIG. 11 is a cross section of a fifth embodiment of an optical ferrule according to the present invention.

Another embodiment of a fiber optic ferrule 400 is illustrated in FIG. 11. The fiber optic ferrule 400 has the same basic parts as the prior embodiments (e.g, main body, front end, back end, middle portion, plurality of optical fiber openings 412, second opening 414, front portion, etc.). The fiber optic ferrule 400 has a plurality of front holes 430. The front holes 430 are in line with and are a continuation of the optical fiber openings 412 across the second opening 414. Each of the front holes 430 have an entrance surface 434 at the end of the front holes 430 that is also angled at the angle α. The front holes 430 also have a fiber stop 432 that is a distance D from the entrance surface 434. The fiber stop 430 is a reduced diameter in the front hole 430 that will engage the cladding of the optical fiber 90 without blocking the light from the optical fiber core. The angle α and the distance D are again determined by the equations in FIG. 4 as discussed above, depending on the ferrule material, the refractive index of the optical fiber. The front holes 430 can be filled with index matching material to assist in the transmission of the light in the front hole and across the boundary with the entrance surface.

Figure 12:
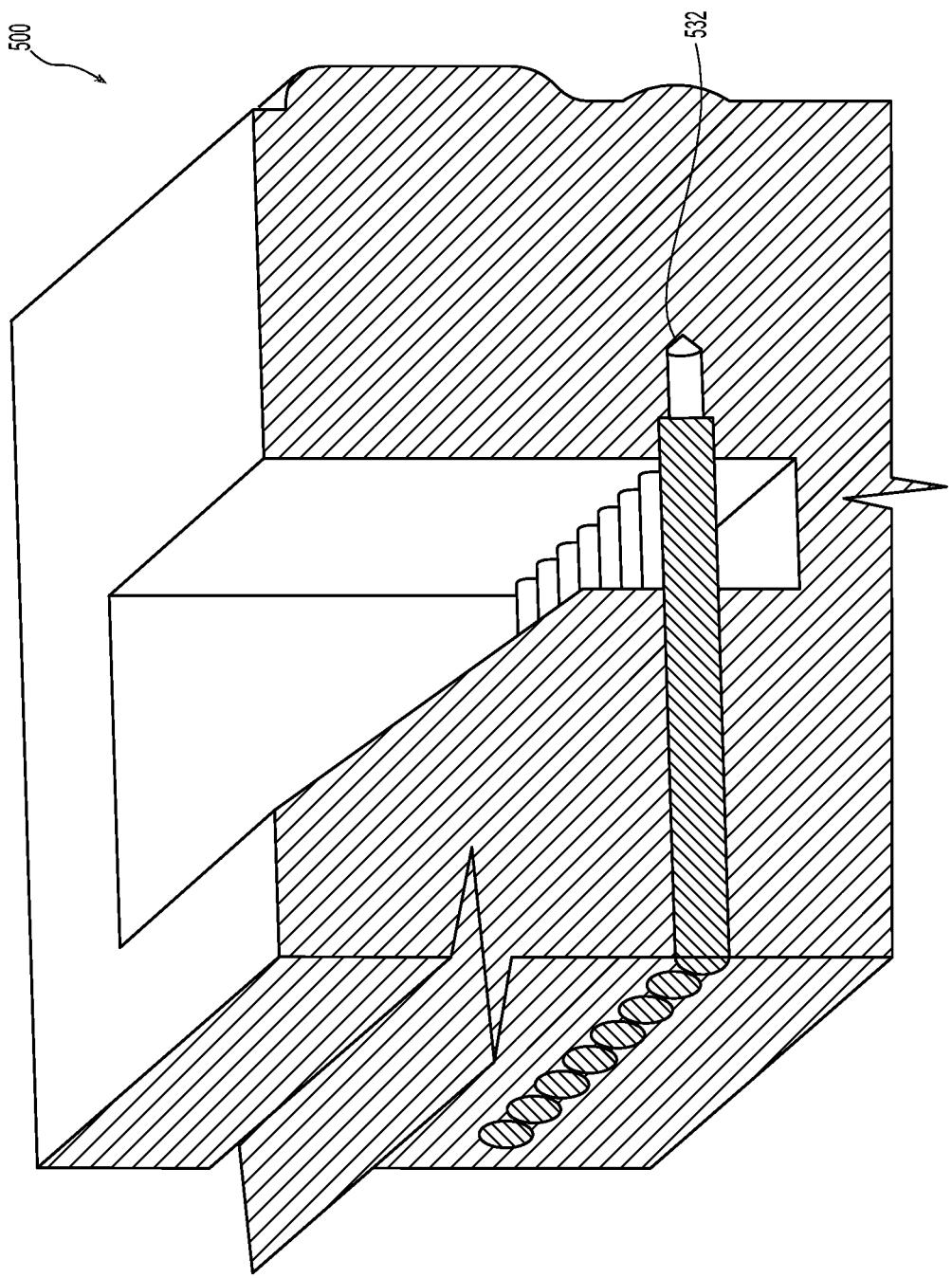
FIG. 12 is a cross section of a sixth embodiment of an optical ferrule according to the present invention.

Another embodiment of a fiber optic ferrule 500 is illustrated in FIG. 12. This fiber optic ferrule 500 is similar to the fourth embodiment (fiber optic ferrule 400), but rather than having a flat surface that is angled in the prior embodiments, the entrance surface has a cone shaped-surface 532.

Figure 13:
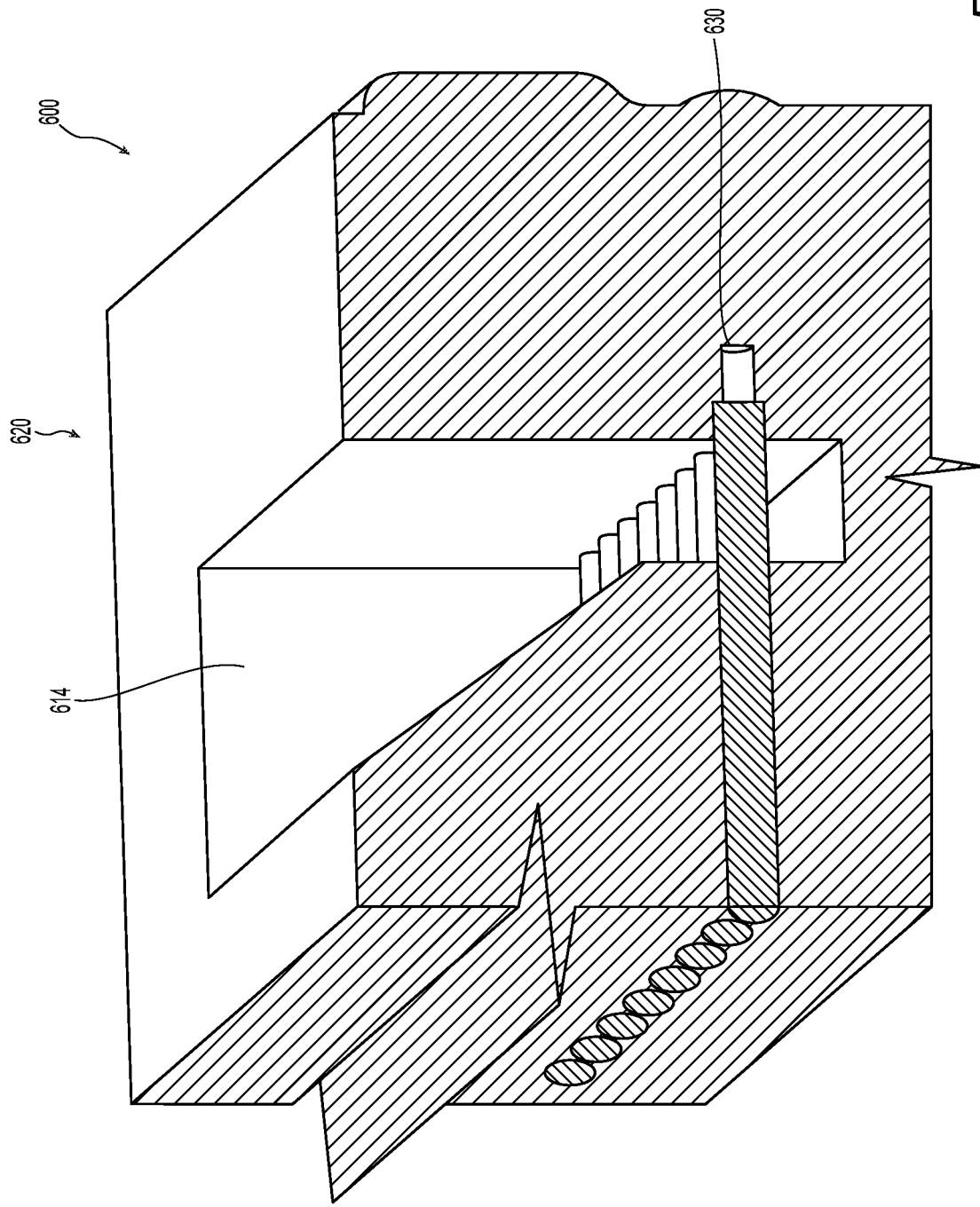
FIG. 13 is a cross section of a seventh embodiment of an optical ferrule according to the present invention.

Another embodiment of a fiber optic ferrule 600 is illustrated in FIG. 13. This fiber optic ferrule 600 is similar to the fourth and fifth embodiments (fiber optic ferrules 400/500), but rather than having a flat or cone-shaped surface of the prior embodiments, the entrance surface has a lensed surface 630 in the front portion 620 and accessible from the second opening 614. The lensed surface 630 will collimate the light and will eliminate the need for the irregular lens of the other embodiments.

Figure 14:
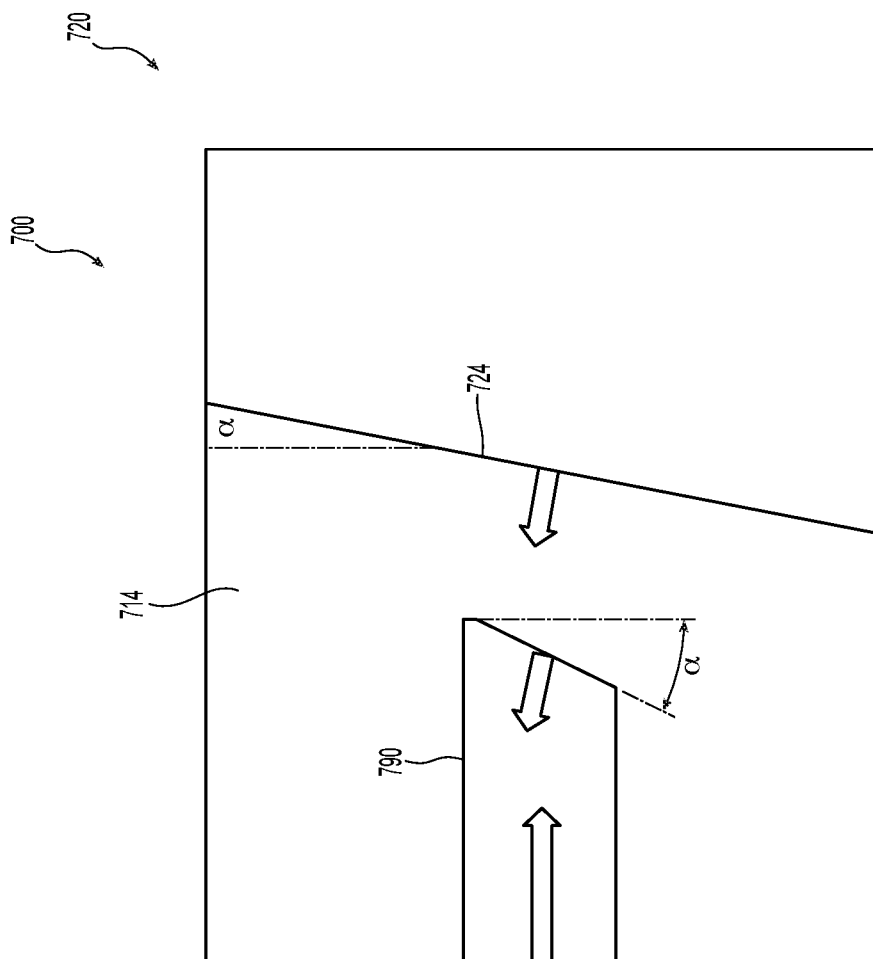
FIG. 14 is a cross section of a eighth embodiment of an optical ferrule according to the present invention.

Another embodiment of a fiber optic ferrule 700 is illustrated in FIG. 14. The optic ferrule 700 has the same basic parts as the prior embodiments (e.g, main body, front end, back end, middle portion, plurality of optical fiber openings, second opening 714, front portion 720, etc.). In this fiber optic ferrule, the optical fiber 790 is cleaved at an angle that is the same as, or as similar to as possible, the angle α. The optical fiber 790 is separated from the front portion 720 and has an index matching adhesive or gel in the second opening 714. In this case, the index matching adhesive preferably matches the index of the fiber optic ferrule 700 rather than the fiber core. Any reflection of the light off the end face of the optical fiber 790 will not reflect back into the fiber core because of the angled cleave (as indicated by an arrow off the angled cleave of the optical fiber end face). However, it is preferable to have a lens at the front end of the fiber optic ferrule 700 to correct any aberrations in the light beam as noted above.

Figure 15:
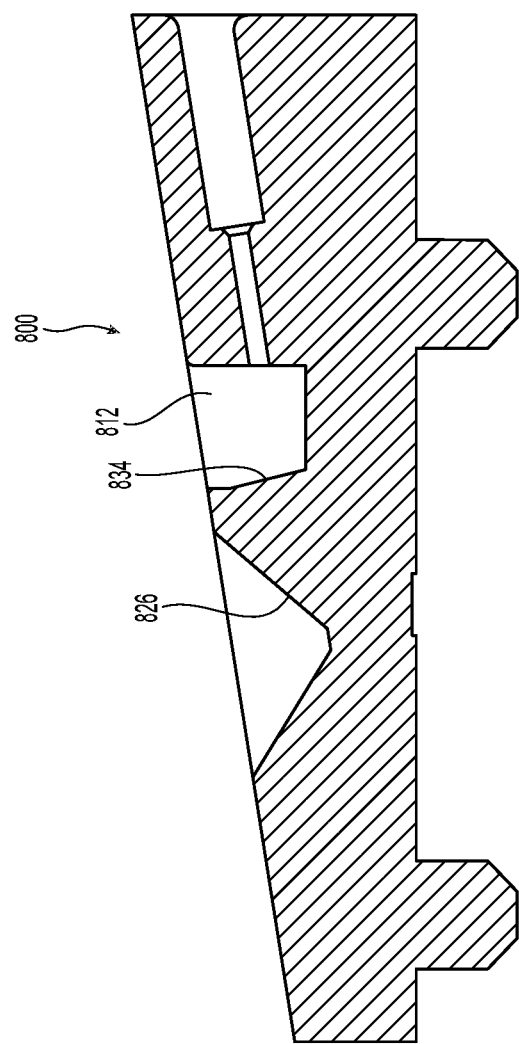
FIG. 15 is a cross section of a ninth embodiment of an optical ferrule according to the present invention.

Another embodiment of a fiber optic ferrule 800 is illustrated in FIG. 15. The basics configuration of this fiber optic ferrule are disclosed in U.S. Pat. No. 8,985,865 (the '865 patent), the contents of which are incorporated herein by reference. Fiber optic ferrule 800 also has an angled entrance surface 834 relative to the longitudinal axis A of the plurality of optical fiber openings 812 to reduce the back reflection in this fiber optic ferrule in the same way as the other ferrules noted above. However, in the '865 patent, the entrance surface is still perpendicular to the longitudinal axis of the optical fiber. The lenses 826 may also be irregular to correct the wavefront aberration caused by the angled surface.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic ferrule comprising:
   a main body having a front end, a back end, and a middle portion disposed between the front end and back end;
   a plurality of optical fiber receiving features in the main body, the plurality of optical fiber receiving features disposed in the middle portion of the main body and configured to receive at least two optical fibers;
   a front portion between the middle portion and the front end, the front portion including a first surface at a non-perpendicular angle to a longitudinal axis of the at least two optical fibers received in the main body, said first surface positioned such that the longitudinal axis passes therethrough and configured such that light that passes through the at least two optical fibers also passes through the first surface; and
   at least one optical fiber stop facing rearward and spaced apart rearwardly from the first surface.

2. The fiber optic ferrule of claim 1, wherein the at least one fiber stop lies in a plane perpendicular to the longitudinal axis.

3. The fiber optic ferrule of claim 2, wherein the first surface forms a portion of an opening disposed between the middle portion and the front end and wherein the at least one optical fiber stop is positioned across the opening from the first surface.

4. The fiber optic ferrule of claim 1, wherein the first surface forms a portion of an opening disposed between the middle portion and the front end, and wherein the front portion increases in thickness toward the longitudinal axis from a top surface.

5. The fiber optic ferrule of claim 2, wherein the first surface forms a portion of an opening disposed between the middle portion and the front end and wherein the at least one optical fiber stop is positioned on the same side of the opening as the first surface to create a gap between an end of the at least two optical fibers and the first surface.

6. The fiber optic ferrule according to claim 1, wherein the main body is unitary.

7. The fiber optic ferrule according to claim 1, wherein first surface comprises a flat surface having an angle of between about 2 and 15 degrees.

8. The fiber optic ferrule according to claim 1, wherein the at least one optical fiber stop is disposed at least 20 microns away from the first rearward facing surface.

9. The fiber optic ferrule according to claim 1, further comprising a plurality of lenses in the front portion and respectively associated with each of the plurality of optical fiber receiving features.

10. A fiber optic ferrule comprising:
a unitary main body having a front end, a back end, and a middle portion disposed between the front end and back end;
a plurality of optical fiber receiving features in the main body, the plurality of optical fiber receiving features disposed in the middle portion of the main body and configured to receive at least two optical fibers; and
a front portion between the middle portion and the front end, the front portion including a first inclined surface at a non-perpendicular angle to a longitudinal axis of the at least two optical fibers received in the main body, said first inclined surface positioned such that the longitudinal axis passes therethrough and configured such that light that passes through the at least two optical fibers also passes through the first inclined surface.

11. The fiber optic ferrule according to claim 10, wherein the first rearward facing surface comprises a cone shaped surface.

12. The fiber optic ferrule of claim 10, wherein the first inclined surface forms a portion of an opening disposed between the middle portion and the front end, and wherein the front portion increases in thickness toward the longitudinal axis from a top surface.

13. The fiber optic ferrule according to claim 12, wherein the first inclined surface is in a front hole in the front portion.

14. The fiber optic ferrule according to claim 13, further comprising an optical fiber stop disposed in the front hole.

15. The fiber optic ferrule according to claim 10, wherein the first inclined surface is in a front hole in the front portion.

16. The fiber optic ferrule according to claim 15, further comprising an optical fiber stop disposed in the front hole.

17. The fiber optic ferrule according to claim 10, further comprising a plurality of lenses in the front portion and respectively associated with each of the plurality of optical fiber receiving features.

18. A fiber optic ferrule comprising:
a unitary main body having a front end, a back end, and a middle portion disposed between the front end and back end;
a plurality of optical fiber receiving features in the main body, the plurality of optical fiber receiving features disposed in the middle portion of the main body and configured to receive at least two optical fibers; and
a front portion between the middle portion and the front end, the front portion including a first rearward facing surface at a non-perpendicular angle to a longitudinal axis of the at least two optical fibers received in the main body, said first rearward surface positioned such that the longitudinal axis passes therethrough and configured such that light that passes through the at least two optical fibers also passes through the first rearward facing surface.

* * * * *